April 14, 1970     J. W. CLARK     3,506,715

TEMPERATURE CONTROL

Filed Sept. 23, 1966

INVENTOR
J. W. CLARK

BY Young & Quigg

ATTORNEYS

United States Patent Office 3,506,715
Patented Apr. 14, 1970

3,506,715
TEMPERATURE CONTROL
Joseph W. Clark, Phillips, Tex., assignor to Phillips
Petroleum Company, a corporation of Delaware
Filed Sept. 23, 1966, Ser. No. 581,510
Int. Cl. C07b 29/00; C07c 149/00; B01j 9/04
U.S. Cl. 260—609                              7 Claims

ABSTRACT OF THE DISCLOSURE

In a cascade temperature control system the first temperature control signal derived from the temperature to be controlled is suppressed to reduce fluctuations therein prior to being applied to the control device which regulates a secondary temperature.

---

This invention relates to a process and apparatus for controlling the temperature of fluid streams. In another aspect this invention relates to an improved system responsive to measured changes in temperature wherein stable control of a temperature is obtained. In another aspect this invention relates to an improved method and apparatus for controlling the temperature of chemical reactions.

Accordingly, an object of this invention is to regulate the temperature of a fluid stream responsive to a measured temperature.

Another object of this invention is to control the temperature of a zone at a predetermined level.

Another object of this invention is to provide a process for controlling the temperature of chemical reactions and a system for carrying out the process.

Other objects and aspects will be apparent to one skilled in the art upon reading the accompanying disclosure and claims.

In accordance with the invention the temperature of a fluid stream passing to a zone, for example, a reactant feed stream passing to a condensation reaction, is controlled to maintain a predetermined temperature in the zone by measuring a first temperature which is desired to be maintained at a predetermined level, suppressing variations in a control signal related to the first temperature and measuring and regulating the rate of heat transfer to or from the fluid stream responsive to the suppressed signal to obtain a temperature level in the fluid stream which produces the desired predetermined temperature level in the zone.

Further in accordance with this invention the temperature level in a zone is measured by a plurality of temperature sensors or a device capable of "tracking" the highest temperature as it varies position within the zone.

Further in accordance with the invention the temperature of the fluid stream is measured after it passes through a heat transfer zone and a signal representing this temperature measurement is transmitted through a secondary control loop to be related to the suppressed signal representing the temperature in the controlled temperature zone.

Figures 1, 2:
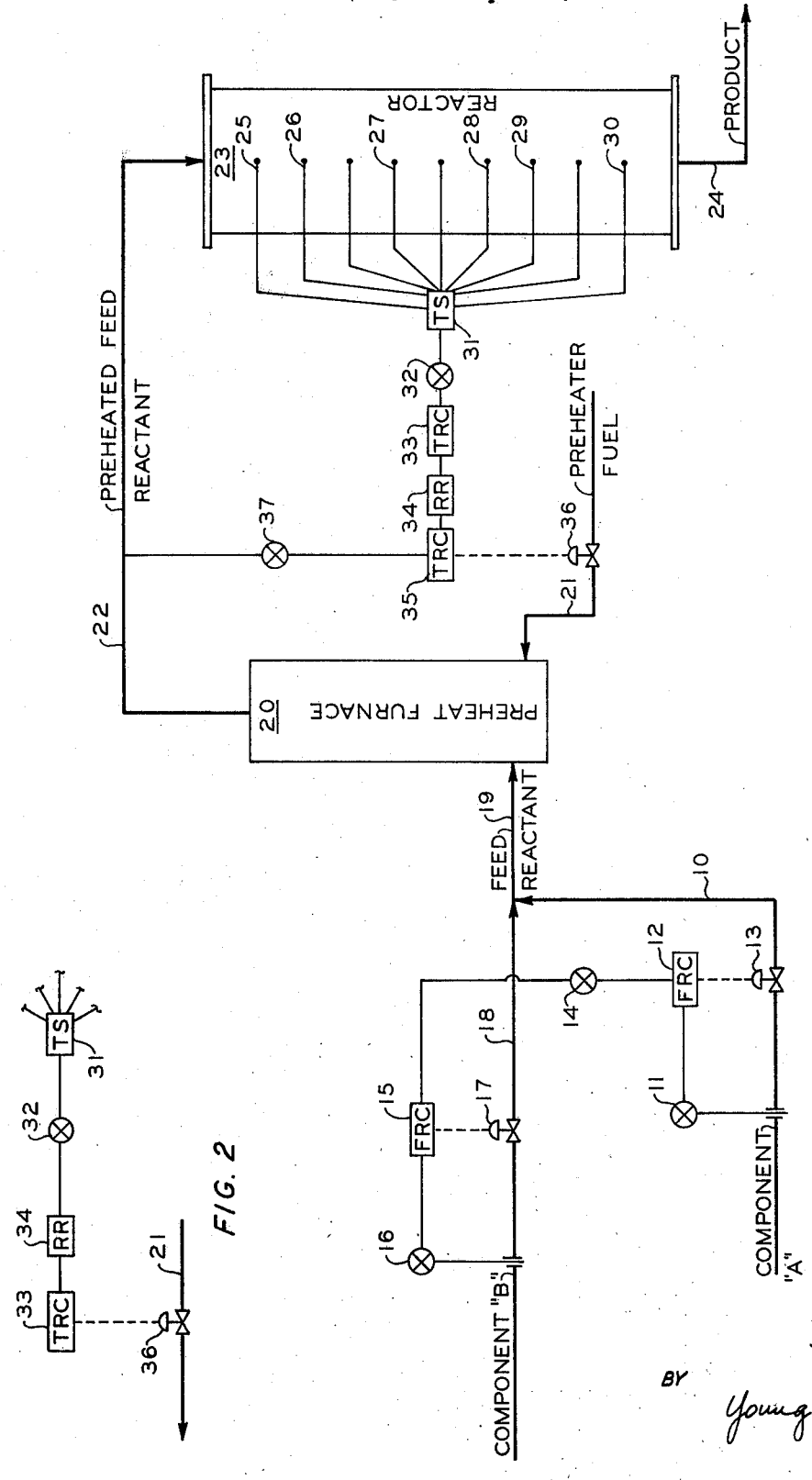
FIGURE 1 is a schematic representation of a component mixing system, heat transfer unit and reactor having an associated temperature control system.
FIGURE 2 illustrates another embodiment of a temperature control system.

Various techniques such as cooling, indirectly or by "quench" method, and preheat control are employed to achieve control of the temperature of a zone. When preheat temperature is manipulated to achieve and hold desired reaction temperatures in a chemical reaction zone, the "process gain" (the large effect on reaction temperature of a small change in preheat temperature) must be taken into account and the preheat temperature controlled so as to achieve a stable reaction front temperature. In the control of chemical reaction temperatures, a fluid stream of which the temperature is controlled in response to reaction temperatures can be a coolant stream or a preheated feed stream and the reaction can be endothermic or exothermic. The invention is not limited to, but is especially advantageous in, controlling the reaction temperature in an exothermic catalytic reaction.

In one advantageous application of the invention, feed reactant to an exothermic catalytic reaction is preheated to a temperature which allows the desired catalytic reaction to be initiated and completed with a practical residence time in a catalytic reactor. If the reactant stream is not heated to the necessary preheat temperature, the reaction will not reach substantial completion in the desired time and/or undesired side reactions will occur. Overheating of the reactant results in an excessive temperature of reaction which lowers the yield of reaction or forms undesired by-products of reaction. As catalyst activity decreases, it is desirable to preheat the reactant to progressively higher temperatures in order to maintain the desired temperature of reaction.

In some reactions a small variation in preheat temperature has a large effect upon reaction temperature. For example, in the hydrogen sulfide-olefin reaction for the production of mercaptans a 1° F. increase in preheat temperature can result in as much as a 10° F. increase in reaction temperature.

A signal resulting from comparison of a signal representing a reaction temperature measurement with a signal representing a desired reaction temperature is modified to suppress variations in the signal. Modification and suppression of variations can be effected by means of a ratio relay. Different factors depending upon the degree of suppression desired can be used in the ratio relay. A suitable relay which can be used is a Taylor Ratio Relay Model 391R, manufactured by the Taylor Instrument Company, Rochester, N.Y., and described in Instruction Manual B986. By suppressing variations from a setpoint or desired value of temperature, the control system acts to diminish process gain, reduce dynamic error, and minimize "hunting" or periodic deviations above and below the setpoint.

Response lag, or the falling behind of one physical condition with respect to another condition to which it is related and variations due to other loop disturbances can be reduced by introducing a secondary control loop to form what is known in the art as a cascade control system. The preheat temperature of the reactant stream is sensed upon flow from the heat exchange unit and a signal is transmitted to a temperature controller having its setpoint determined by the modified ratio relay signal. This temperature controller is operatively connected to a valve or other flow control means whereby the flow of the heat transfer media to the heat exchange unit is controlled to obtain desired temperature level in the reactant feed stream.

Catalytic reactions are often carried out over a fixed bed catalyst and the highest temperature of reaction will vary in location within the catalyst with the degree of activity of the catalyst. Since the highest temperature of reaction is the condition to be controlled, it is necessary to measure the highest temperature of reaction. This can be accomplished by employing a plurality of temperature sensing devices positioned at different points within the reactor, scanning the temperature measurements, and selecting the highest measured temperature to be that temperature of reaction. A signal representative of this highest temperature is employed according to the invention. The highest temperature of reaction can also be measured by use of a temperature sensing device which "tracks"

and moves with the highest temperature as it varies position within the catalyst bed. Temperatures representative of two spaced positions within the catalyst can be measured and the position of a temperature measuring device can be adjusted responsive to the measured temperature differential.

Referring now to the drawing, FIGURE 1, which illustrates one embodiment of the invention, providing for control of component ratio in the feed stream as well as temperature control of the fluid stream; component A of the reactant mixture flows through line 10, the flow of component A being measured and a signal representative of that flow being transmitted by a flow transmitter 11 to flow recorder-controller 12. Flow recorder 12 is operatively connected to valve 13 in line 10 and thereby controls the flow of component A. The signal from flow transmitter 11 is simultaneously communicated to ratio relay 14 which modifies the component A flow signal by multiplying it by a predetermined ratio of components desired in the feed. The ratioed signal is transmitted to flow recorder-controller 15 which compares the setpoint from ratio relay 14 to the actual flow of component B as represented by flow transmitter 16 signal. Flow recorder-controller 15 is operatively connected to valve 17 in line 18 and flow of component B is adjusted so that flow transmitter 16's signal and ratio relay 14's signal are equal.

Component A and component B are mixed to form a reactant feed stream which flows through line 19 to preheat furnace 20. Combustion material is added to preheat furnace 20 through line 21. Preheated reactant feed is removed from preheat furnace 20 via line 22 to reactor 23. Reactor 23 contains a catalyst bed having a hot zone or vigorous reaction front zone. Reaction products are removed from reactor 23 via line 24.

Since the location of the vigorous reaction front varies with the activity of the catalyst, a plurality of temperature sensing means, for example, thermocouples, 25, 26, 27, 28, 29, and 30, are positioned at different locations within the reactor. Temperature switch 31 allows the highest temperature of reaction to be selected. Scanning for the highest temperature of reaction can be done manually or by automatic means. A signal representative of the highest reaction temperature is transmitted by temperature transmitter 32 to temperature recorder-controller 33 wherein the desired value of the temperature of reaction is compared with the actual reaction temperature. The output signal from the temperature recorder-controller 33 is communicated to ratio relay 34 wherein the signal is modified so as to obtain stable control of the reaction temperature. The modified signal is transmitted to temperature recorder controller 35 as the set point or desired value of the temperature of the preheated feed reactant stream. Temperature recorder-controller 35 also receives a signal representing the temperature of the preheated reactant feed from temperature transmitter 37. Temperature recorder-controller 35 is operatively connected with valve 36 in line 21. Valve 36 is adjusted so as to provide a flow of combustion materials to preheat furnace 20 which will produce the desired reactant temperature level.

FIGURE 2 illustrates the use of the invention in a control system which does not contain the secondary control loop. Like reference numerals refer to like elements in FIGURE 1.

A signal representative of the highest temperature of reaction from temperature switch 31 is transmitted by temperature transmitter 32 to ratio relay 34. Ratio relay 34 produces a modified control signal which acts as the input signal to temperature recorder controller 33. In temperature recorder 33, the modified control signal is compared with a set point and as a result of this comparison temperature recorder controller 35 produces an output signal which positions control valve 36 in line 21.

The control system has been illustrated in conjunction with an exothermic reaction over a fixed bed catalyst. The system is equally applicable to reactions in which a fluidized catalyst is used in which case the plurality of temperature sensors would be unnecessary. In fact, the reaction does not have to be a catalytic reaction. The system has been illustrated as applied to a preheated feed stream but the invention applies equally well to a coolant stream.

EXAMPLE I

The following example illustrates the system as shown in FIGURE 1 as used for the production of aliphatic mercaptans. 1185 pounds per hour of an olefin-containing stream (component A) and 994 pounds per hour of a hydrogen sulfide-containing stream (component B) are preheated to approximately 400° F. in preheat furnace 20. The preheated reactants are fed to reactor 23 and react in the presence of cobalt molybdate catalyst to produce a reaction effluent stream containing 579 pounds per hour of mercaptans and 1600 pounds per hour other constituents.

The highest temperature within reactor 23 is measured and a pressure signal representative of this temperature is transmitted to temperature recorder controller 33 wherein the pressure signal is compared with a pressure representing a set point of 675° F. As a result of this comparison, temperature recorder controller 33 produces an output signal which is transmitted through ratio relay 34 as the set point for temperature recorder controller 35. Ratio relay 34 modifies the output pressure signal from temperature recorder controller 33 according to the following formula:

$$P_o = R(P_i - K_s) + K_b$$

where:

$P_o$ = output pressure to TRC 35 (suppressed signal)
$P_i$ = input pressure from TRC 33
$R$ = ratio (suppression factor)
$K_s$ = suppression constant
$K_b$ = bias constant Temperature recorder controller 35 receives the suppressed signal ($P_o$) which acts as a stabilized set point. Temperature recorder controller 35 receives measurement signals of the preheated feed stream temperature from transmitter 37. As a result of comparison of these signals, temperature recorder controller 35 produces an output signal which positions control valve 36 in fuel line 21 so as to regulate the flow of fuel to preheat furnace 20.

Thus, secondary temperature fluctuations which exist within the reactor as a result of the exothermic gas phase reaction are suppressed so that stable operation of the preheat furnace, which possesses substantial thermal inertia, is achieved. The resulting stabilized feed stream temperature contributes greatly to maintaining a steady temperature level in the reactor.

Reasonable variation and modification are within the scope of this invention which provides a method of controlling temperature.

That which is claimed is:

1. A process for controlling at a predetermined value a temperature in a zone comprising:
   (a) passing a fluid stream through a heat transfer region to obtain an essentially gaseous stream and subsequently passing the thus produced essentially gaseous stream into the zone;
   (b) producing a first signal representative of a temperature in the zone;
   (c) comparing the first signal and a predetermined signal representative of the corresponding desired temperature for the zone to provide a first control signal as a result of the comparison;
   (d) modifying the first control signal by subtraction therefrom of a predetermined value, multiplication of the resulting difference by a second predetermined value which is less than 1, and addition of the resulting product of the multiplication to a third predetermined value to provide a second control signal;
   (e) producing a second signal representative of the temperature of the essentially gaseous stream;

(f) comparing said second control signal and said second signal to provide a third control signal as a result of the comparison; and (g) regulating the amount of heat transfer with respect to said fluid stream in the heat transfer region responsive to the third control signal.

2. The process of claim 1 wherein said second control signal is produced according to the equation $$P_o = R(P_i - K_s) + K_b$$

wherein $P_o$ is said second control signal, $P_i$ is said first control signal, R is a ratio (suppression factor) which is less than 1, $K_s$ is a suppression constant and $K_b$ is a bias constant.

3. The process of claim 1 wherein the first signal is representative of a temperature of an exothermic chemical reaction in the zone.

4. The process of claim 3 wherein the chemical reaction comprises reacting hydrogen sulfide with an olefin or a mixture of olefins in the presence of a cobalt molybdate catalyst to produce mercaptans.

5. The process of claim 3 wherein the first signal representative of a temperature of the chemical reaction is representative of the highest temperature within the zone.

6. The process of claim 5 wherein the temperature within the zone is measured through the use of a plurality of thermocouples.

7. The process of claim 5 wherein said zone comprises a fixed catalyst bed, the first signal representative of a temperature within the zone is produced by measuring a plurality of temperatures spaced along said fixed catalyst bed, and selecting the highest of the temperatures measured as the temperature which is represented by the first signal.

References Cited

UNITED STATES PATENTS

| | | |
|---|---|---|
| 1,997,559 | 4/1935 | Hajek. |
| 2,285,716 | 6/1942 | Hulsberg _____ 23—288 |
| 3,340,184 | 9/1967 | Eng et al. |
| 3,254,071 | 5/1966 | Morgan et al. |
| 3,365,393 | 1/1968 | Wooten _____ 202—160 XR |

OTHER REFERENCES

Reid, Organic Chemistry of Bivalent Sulfur, vol. 1, pp. 18–21 (1958).

Haines, J. E. Automatic Control of Heating and Air Conditioning, McGraw-Hill, 1961, pp. 146, 147, 163, 164, 223, 224 relied on.

MORRIS O. WOLK, Primary Examiner

R. M. REESE, Assistant Examiner

U.S. Cl. X.R.

23—1, 230, 232, 288; 196—132; 202—160; 203—2